US009046213B2

(12) United States Patent
Huang

(10) Patent No.: US 9,046,213 B2
(45) Date of Patent: Jun. 2, 2015

(54) LIFTING DEVICE

(71) Applicant: Ming-Hsien Huang, New Taipei (TW)

(72) Inventor: Ming-Hsien Huang, New Taipei (TW)

( * ) Notice: Subject to any disclaimer, the term of this patent is extended or adjusted under 35 U.S.C. 154(b) by 225 days.

(21) Appl. No.: 13/674,097

(22) Filed: Nov. 12, 2012

(65) Prior Publication Data

US 2014/0077050 A1 Mar. 20, 2014

(30) Foreign Application Priority Data

Sep. 17, 2012 (TW) .............................. 101217957 U

(51) Int. Cl.
  F16M 11/04 (2006.01)
  F16M 13/02 (2006.01)
  A47B 9/10 (2006.01)
  A47B 21/007 (2006.01)
  A47B 9/12 (2006.01)
  F16M 11/18 (2006.01)
  F16M 11/00 (2006.01)

(52) U.S. Cl.
  CPC ............... *F16M 13/022* (2013.01); *A47B 9/10* (2013.01); *A47B 21/0073* (2013.01); *A47B 9/12* (2013.01); *F16M 11/18* (2013.01); *F16M 11/00* (2013.01); *F16M 11/04* (2013.01); *F16M 11/046* (2013.01); *F16M 2200/047* (2013.01)

(58) Field of Classification Search
  CPC ....... F16M 11/00; F16M 11/04; F16M 11/18; A47B 21/0073; A47B 9/10; A47B 9/12
  USPC ......... 248/161, 162.1, 332, 404, 422, 123.11, 248/295.11, 919
  See application file for complete search history.

(56) References Cited

U.S. PATENT DOCUMENTS

| 3,575,368 | A  | * | 4/1971  | Thomas et al. ............... 248/572 |
| 5,868,079 | A  | * | 2/1999  | Charny ............................. 108/7 |
| 6,286,794 | B1 | * | 9/2001  | Harbin ....................... 248/123.2 |
| 7,854,417 | B2 | * | 12/2010 | Gan et al. ...................... 248/161 |
| 8,091,841 | B2 | * | 1/2012  | Jones et al. ................. 248/125.2 |
| 8,228,668 | B2 | * | 7/2012  | Asamarai et al. ......... 361/679.05 |
| 8,272,617 | B2 | * | 9/2012  | Huang .......................... 248/422 |
| 2006/0145036 | A1 | * | 7/2006 | Jones et al. ................ 248/188.5 |
| 2006/0185563 | A1 | * | 8/2006 | Sweere et al. .................. 108/28 |
| 2008/0099637 | A1 | * | 5/2008 | Pai ................................. 248/157 |
| 2008/0250989 | A1 | * | 10/2008 | Kozlowski et al. ........... 108/147 |
| 2012/0119040 | A1 | * | 5/2012 | Ergun et al. .................... 248/126 |
| 2012/0187056 | A1 | * | 7/2012 | Hazzard et al. ................. 211/26 |
| 2012/0187256 | A1 | * | 7/2012 | Ergun et al. .............. 248/123.11 |
| 2015/0001355 | A1 | * | 1/2015 | Huang ..................... 248/123.11 |

FOREIGN PATENT DOCUMENTS

TW   201207283   2/2012

* cited by examiner

*Primary Examiner* — Terrell McKinnon
*Assistant Examiner* — Eret McNichols
(74) *Attorney, Agent, or Firm* — Jianq Chyun IP Office

(57) ABSTRACT

A lifting device adapted to bear an object is provided. The lifting device includes a body, a sliding member, an elastic member, an adjusting member and a connecting member. The sliding member is slidably disposed at the body moves along a first axis and stays at any position between a highest position and a lowest position. A first end of the elastic member is disposed at the body. The adjusting member is pivotally disposed at the body and linked up to the elastic member. The connecting member is disposed between the adjusting member and the sliding member. Wherever the sliding member is located, total torques generated by a force provided by the elastic member, gravity of the object and the sliding member, friction forces between the body, the sliding member, the elastic member, a fixed pulley and the connecting member are substantially zero.

19 Claims, 13 Drawing Sheets

LIFTING DEVICE

CROSS-REFERENCE TO RELATED APPLICATION

This application claims the priority benefit of Taiwan application serial no. 101217957 filed on Sep. 17, 2012. The entirety of the above-mentioned patent application is hereby incorporated by reference herein and made a part of this specification.

BACKGROUND

1. Technical Field

The invention relates to a lifting device. Particularly, the invention relates to a lifting device for rendering an object to stay at any position.

2. Related Art

Generally, objects with smaller bases (for example, displays) or working platforms can be erected on a desktop or spaced from the ground through supporting stands. However, as user's needs increase, supporting stands only for carrying the object are not satisfiable. For example, it is necessary for a display to be selectively levelled for different situations or users. Thus, a function of height adjusting is important.

TW201207283A1 discloses a slidable supporting stand, in which a gear set and a spring are used for compensating the torque and for reducing the stroke length of the stretched spring, as the sliding support base moves down, so as to let a display position at any desired level. However, since there are several gears, a matching problem of engagement between different gears easily occurs. Besides, its post maintenance is heavy and complicated. For example, the gear set is required to be oiled regularly, and a casing of the slidable supporting stand is probably disassembled and assembled before and after the oiling. Moreover, the cost of the gear set is generally high.

SUMMARY

The invention is directed to a lifting device, which is economic and is simple in maintenance and design.

The invention provides a lifting device adapted to carry an object. The lifting device comprises a body, a sliding member, an elastic member, an adjusting member and a connecting member. The sliding member is slidably disposed at the body for carrying the object, moves along a first axis and stays at any position between a highest position and a lowest position. The elastic member comprises a first end disposed at the body and a second end. The adjusting member is linked up to the elastic member, and comprises a first pivot pivotally connected to the body and a rotating portion capable of rotating relative to the first pivot. The connecting member has two ends respectively connecting the rotating portion of the adjusting member and the sliding member.

When the sliding member is located at the highest position relative to the body, the elastic member deforms to provide a first force to the adjusting member. Taking the first pivot of the adjusting member as a fulcrum, a sum of a torque generated by the first force, a torque generated by gravity of the object and the sliding member, and a torque generated by friction forces between the body, the sliding member, the elastic member, a fixed pulley and the connecting member are substantially zero.

When the sliding member is located at the lowest position relative to the body, the elastic member deforms to provide a second force to the adjusting member. Taking the first pivot of the adjusting member as the fulcrum, a sum of a torque generated by the second force, a torque generated by gravity of the object and the sliding member, and a torque generated by friction forces between the body, the sliding member, the elastic member, the fixed pulley and the connecting member are substantially zero.

According to the above descriptions, in the lifting device of the invention, the object disposed on the sliding member can be moved relative to the body. Moreover, since the adjusting member is linked up to the elastic member, when the elastic member deforms, the adjusting member rotates relative to the first pivot of the adjusting member, so that a moment-arm of a force exerted to the adjusting member by the elastic member changes along with a position of the adjusting member. When a deforming amount of the elastic member is small, a distance between the force endured by the adjusting member and the first pivot of the adjusting member is large. When the deforming amount of the elastic member is large, the distance between the force endured by the adjusting member and the first pivot of the adjusting member is small. Therefore, wherever the sliding member is at any position, taking the first pivot of the adjusting member as the fulcrum, a sum of a torque generated by the force endured by the adjusting member, a torque generated by gravity of the object and the sliding member, and a torque generated by friction forces between the body, the sliding member, the elastic member, the fixed pulley and the connecting member are substantially zero. Therefore, the object can stay at any position on a sliding rail, so as to achieve an effect of staying at any position.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

Figure 1:
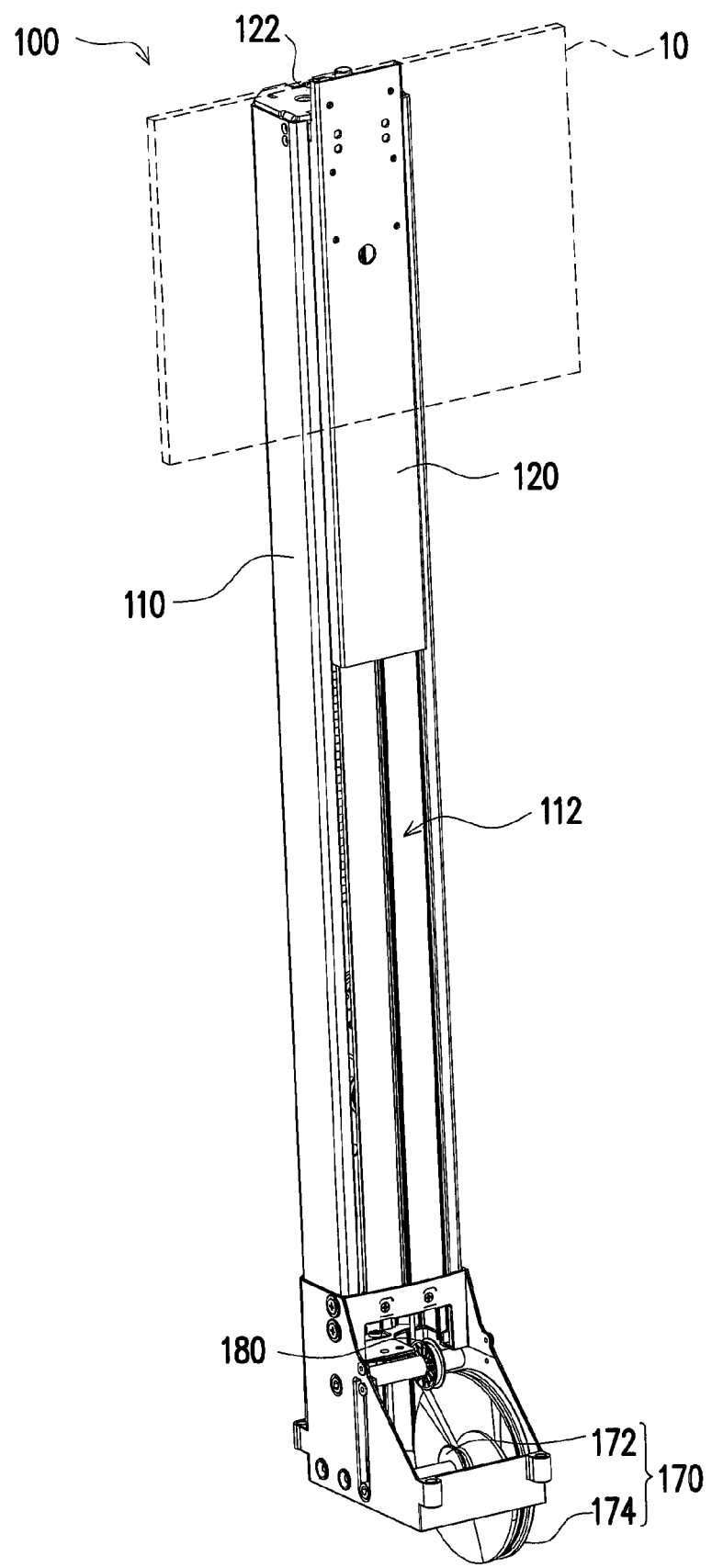
FIG. 1 is a schematic diagram of a lifting device with a sliding member located at a highest position according to an embodiment of the invention.
Figure 2:
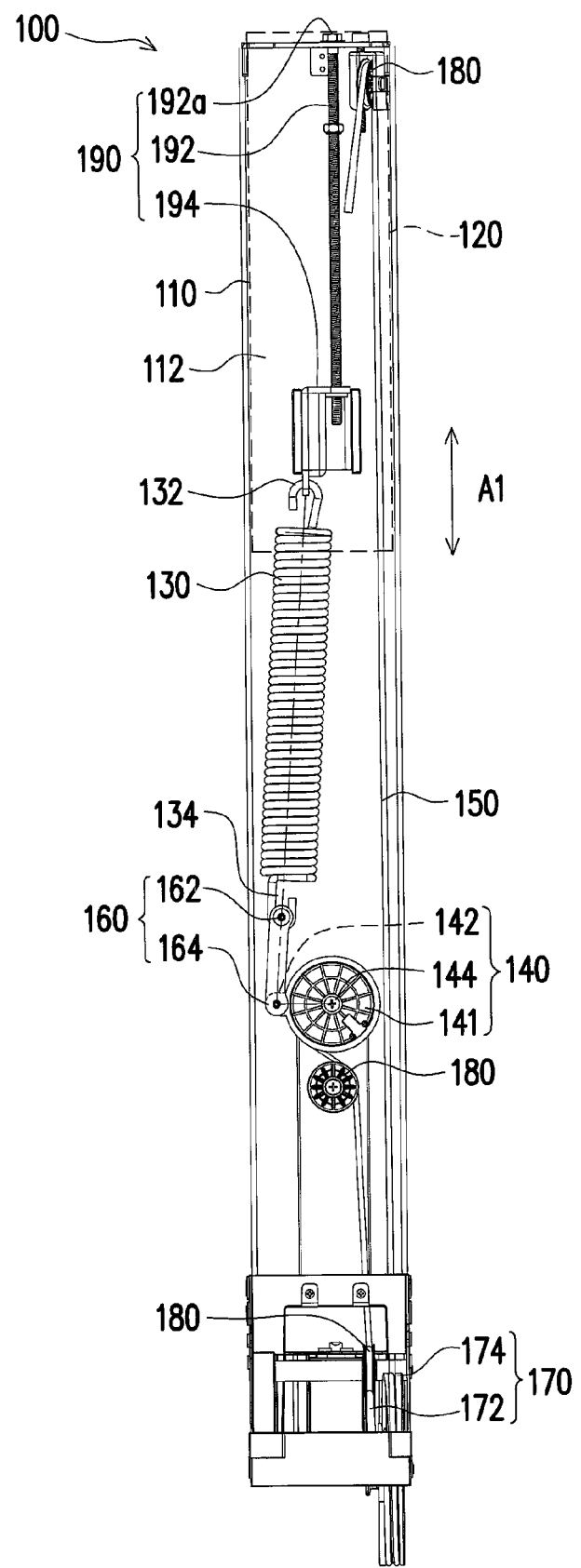
FIG. 2 is an internal front view of FIG. 1.
Figure 3:
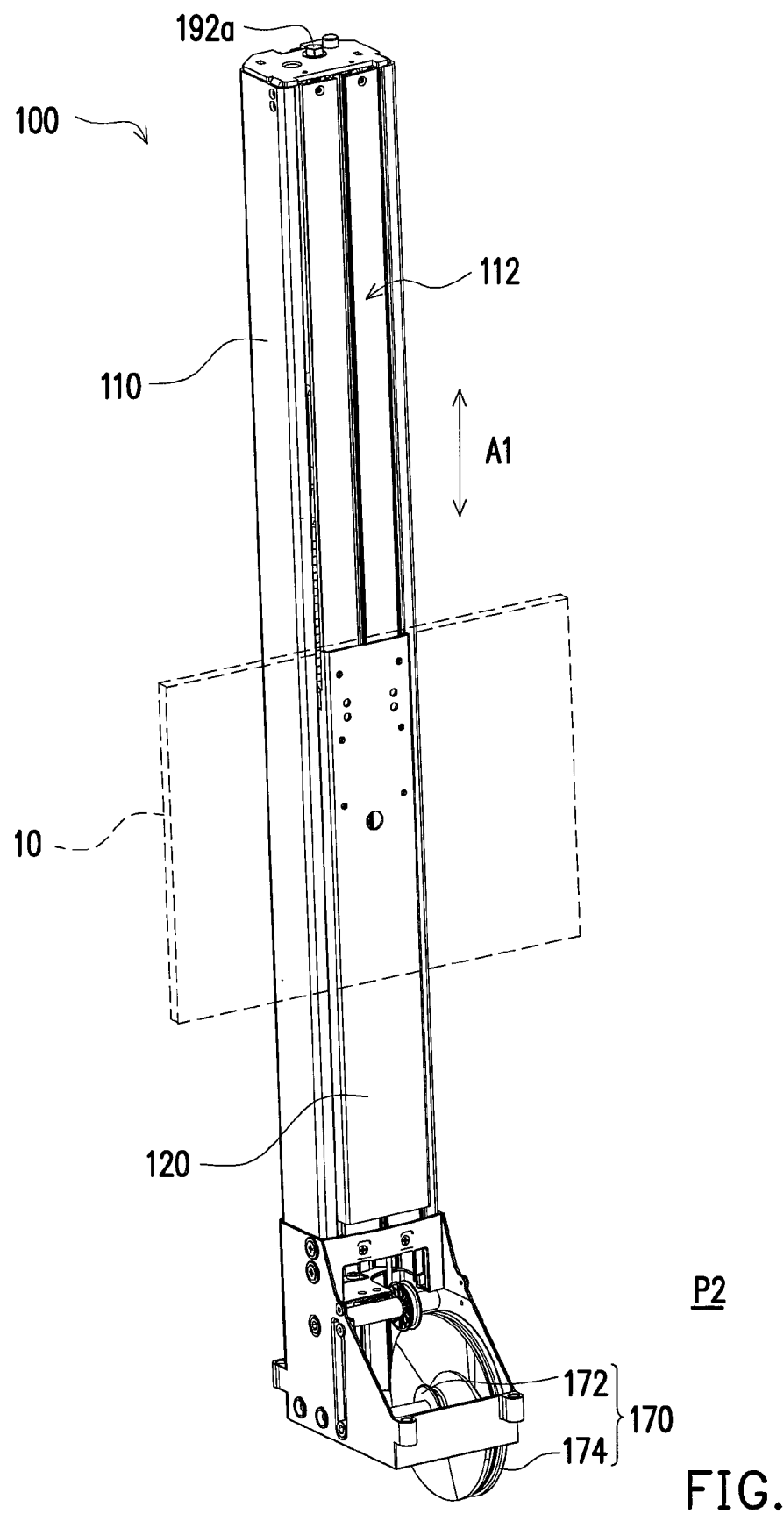
FIG. 3 is a schematic diagram of the lifting device of FIG. 1 with the sliding member located at a lowest position.
Figure 4:
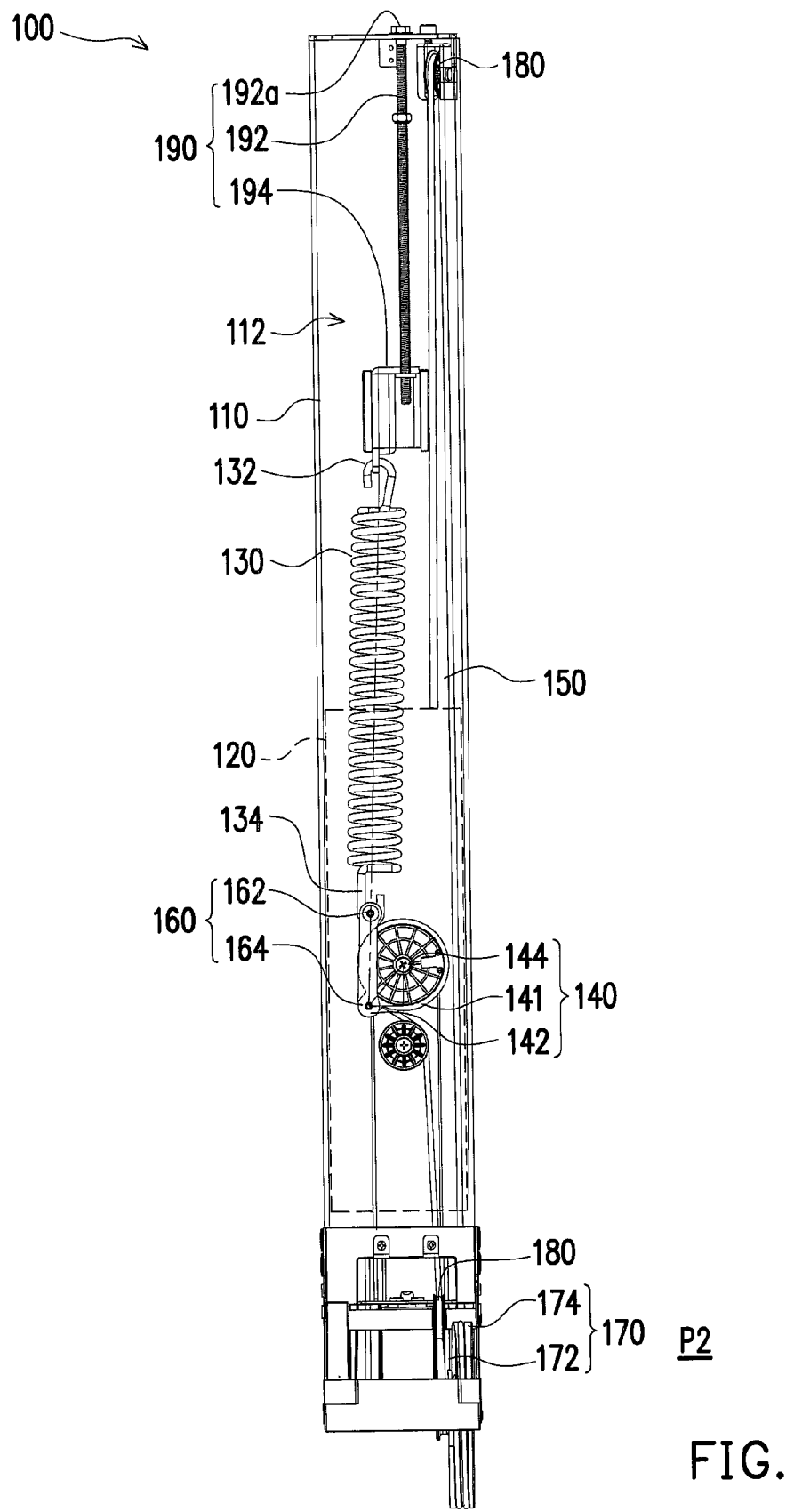
FIG. 4 is an internal front view of FIG. 3.

FIG. 1 is a schematic diagram of a lifting device with a sliding member located at a highest position according to an embodiment of the invention. FIG. 2 is an internal front view of FIG. 1. FIG. 3 is a schematic diagram of the lifting device of FIG. 1 with the sliding member located at a lowest position. FIG. 4 is an internal front view of FIG. 3. In order to show the operation relations of the lifting device, the sliding members in FIG. 2 and FIG. 4 are represented by dot lines.

Referring to FIG. 1 and FIG. 4, the lifting device 100 of the present embodiment includes a body 110, a sliding member 120, an elastic member 130, an adjusting member 140 and a connecting member 150. The sliding member 120 is slidably disposed on the body 110, and moves along a first axis A1 and stays at any position between a highest position P1 and a lowest position P2. The elastic member 130 includes a first end 132, and the first end 132 of the elastic member 130 is disposed at the body 110. The adjusting member 140 is disposed at the body 110 and linked up to the elastic member 130. The adjusting member 140 includes a first pivot 144 pivotally connected to the body 110, a fixed pulley 141 sleeving the first pivot 144 and a rotating portion 142 capable of rotating relative to the first pivot 144. In the present embodiment, the rotating portion 142 is formed on a circumferential surface of the fixed pulley 141 and is arm-like. Two ends of the connecting member 150 are respectively connected to the adjusting member 140 and the sliding member 120, and the connecting member 150 moves along with deformation of the elastic member 130.

In the present embodiment, the lifting device 100 further includes a connection rod 160, which includes a first end 162 and a second end 164 opposite to each other. The elastic member 130 further includes a second end 134 opposite to the first end 132, where the second end 134 of the elastic member 130 is connected to the first end 162 of the connection rod 160, and the rotating portion 142 is connected to the second end 164 of the connection rod 160.

In the present embodiment, the body 110 includes the sliding rail 112. As shown in FIG. 1 and FIG. 3, the sliding member 120 of the lifting device 100 can be used to carry and fix an object 10, and when an external force is exerted to the object 10, the object 10 drives the sliding member 120 to move along the sliding rail 112. As the sliding member 120 moves, it drives the connecting member 150 to rotate the adjusting member 140, and causes deformation of the elastic member 130. As the elastic member 130 deforms increasingly, an elastic force applied to the rotating portion 142 correspondingly increases. Thus, when the external force is no more applied, the elastic force tends to drive the object 10 and the sliding member 120 upwards. Therefore, a compensation mechanism is required to keep the object 10 and the sliding member 120 staying at any desired position, which is described below.

In the present embodiment, a compensation mechanism of torques is employed. It should be noted that the moving directions of the sliding member 120 and the object 10 are substantially orthogonal to the ground (parallel to the first axis A1) in the present embodiment, so the direction of the effective moment-arm is substantially orthogonal to the ground.

Figure 5:
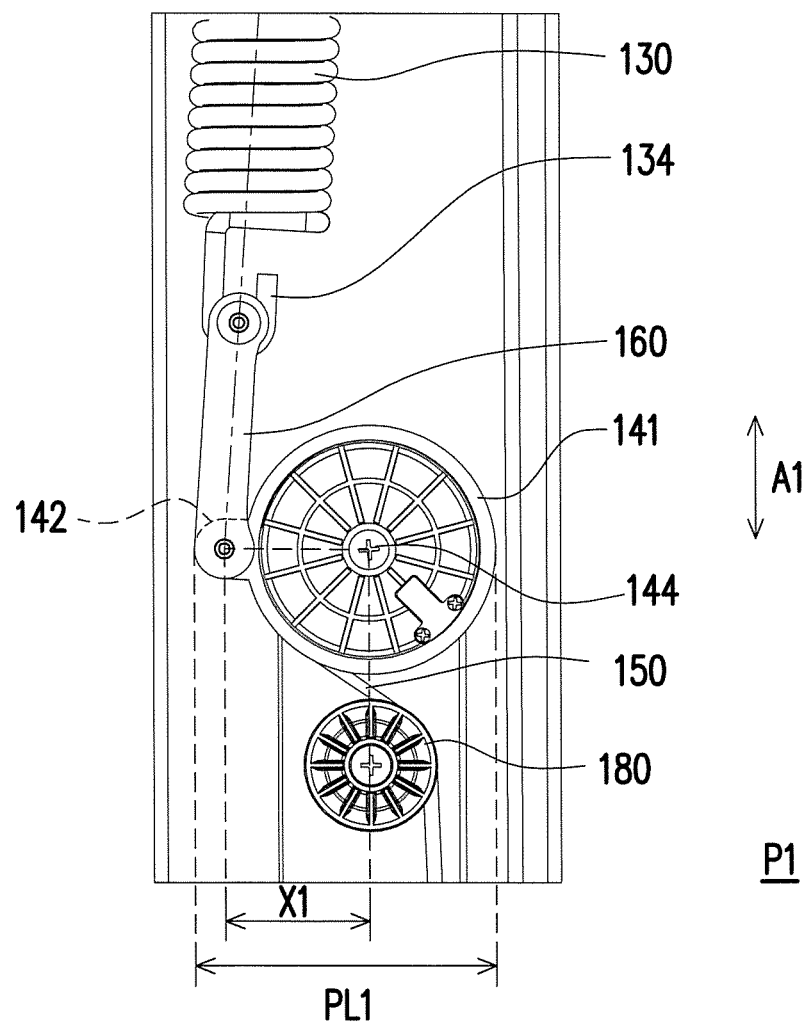
FIG. 5 is a partially enlarged view of FIG. 2.

FIG. 5 is a partially enlarged view of the lifting device of FIG. 2. Referring to FIG. 5, when the sliding member 120 is located at a highest position P1 relative to the body 110, the elastic member 130 deforms to provide a first force to the rotating portion 142. At this time, a deforming amount of the elastic member 130 is the minimum, relatively. A connection line of the rotating portion 142 and the first pivot 144 of the adjusting member 140 is horizontal, and a projection length PL1 of the adjusting member 140 orthogonal to the first axis Al is the maximum. Thus, a maximum of the effective moment-arm X1 (for calculating torques) occurs relatively, equalling the distance between a force exerting point of the first force exerted to the rotation portion 142 and the first pivot 144 of the adjusting member 140.

When the sliding member 120 moves from the highest position P1 to the lowest position P2 relative to the body 110, the projection length of the adjusting member 140 orthogonal to the first axis Al gradually decreases (from PL1 in FIG. 5 to PL2 in FIG. 6), the effective moment-arm gradually decreases (from X1 in FIGS. 5 to X2 in FIG. 6), and the force generated by the elastic member 130 is gradually increased.

Figure 6:
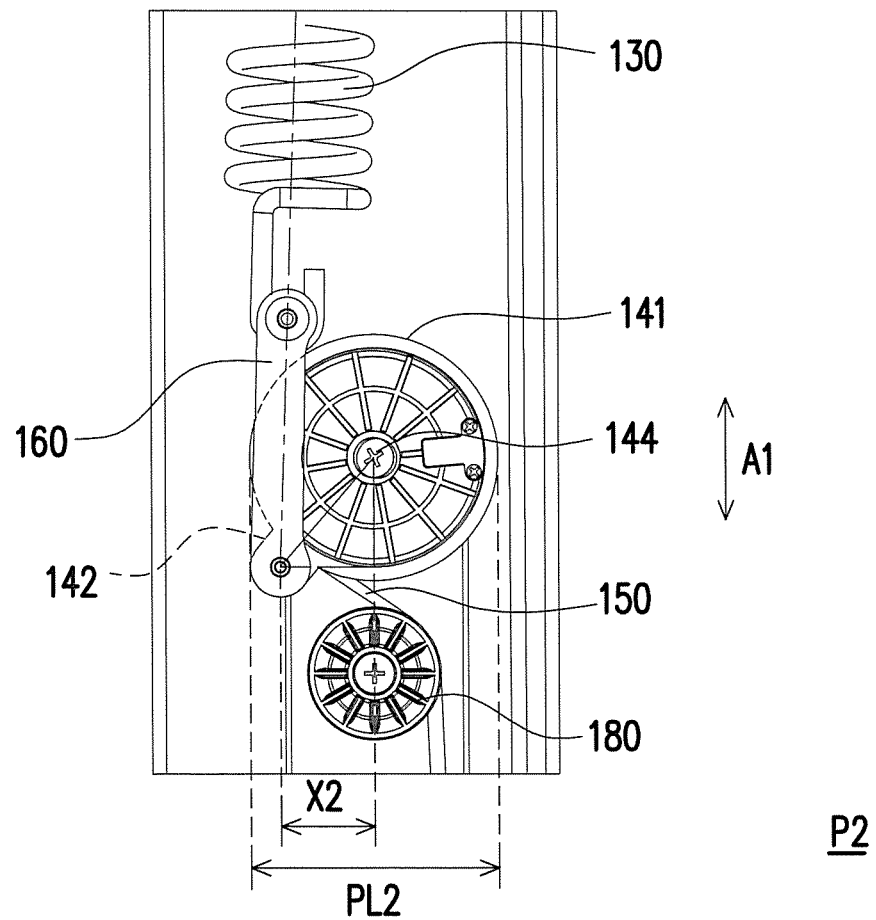
FIG. 6 is a partially enlarged view of FIG. 4.

FIG. 6 is a partially enlarged view of the lifting device of FIG. 4. Referring to FIG. 6, when the sliding member 120 is located at the lowest position P2 relative to the body 110, the elastic member 130 deforms to provide a second force to the rotating portion 142. At this time, the deforming amount of the elastic member 130 is the maximum, elatively. Since the rotating portion 142 rotates along with the deformation of the elastic member 130, an orthogonal distance between the force exerted to the rotating portion 142 and the first pivot 144 of the adjusting member 140 is shortened. This means that the effective moment-arm is also shortened. Thus, when the sliding member 120 is located at the lowest position P2 relative to the body 110, the effective moment-aim X2 is the shortest. Namely, when the sliding member 120 is located at the highest position P1 relative to the body 110, the first force is the minimum, and when the sliding member 120 is located at the lowest position P2 relative to the body 110, the second force is the maximum. In the present embodiment, the effective moment-arms of the first force and the second force that take the first pivot 144 of the adjusting member 140 as the fulcrum are all orthogonal to a moving direction of the sliding member 120.

In addition, as shown in FIG. 1, the sliding member 120 includes a friction block 122 at a side, and during a process that the sliding member 120 slides in a sliding rail 112, the friction block 122 contacts the body 110 to provide a friction force.

In the present embodiment, taking the first pivot 144 of the adjusting member 140 as a fulcrum, a sum of a torque generated by the first force, a torque generated by gravity of the object 10 and the sliding member 120, and a torque generated by a first total friction force are substantially zero, wherein the first total friction force is mainly a sum of friction forces between the body 110, the sliding member 120, the elastic member 130, the adjusting member 140 and the connecting member 150. Similarly, also taking the first pivot 144 of the adjusting member 140 as the fulcrum, a sum of a torque generated by the second force, a torque generated by gravity of the object 10 and the sliding member 120, and a torque generated by a second total friction force are substantially zero, wherein the second total friction force is mainly a sum of friction forces between the body 110, the sliding member 120, the elastic member 130, the adjusting member 140 and the connecting member 150. Namely, in the present embodiment, regarding any position of the sliding member 120 relative to the body 110, a sum of the torques generated by the forced provided to the rotating portion 142 by the elastic member 130, the gravity of the object 10 and the sliding member 120 and the friction forces between various components of the lifting device 100 (the body, the sliding member 120, the elastic member 130, the adjusting member 140, the connecting member 150 and the connection rod 160, etc.) while taking the first pivot 144 of the adjusting member 140 as the fulcrum is substantially zero.

After the object 10 is fixed to the sliding member 120 of the lifting device 100, the user can pull the object 10 or the sliding member 120 to adjust the object 10 to a suitable position (for example, the lowest position P2 shown in FIG. 3). When the user stops pulling, since the torque generated by the gravity of the object 10 and the sliding member 120 is equal to the torque generated by the force exerted by the elastic member 130 and by a net force of the friction forces between various components of the lifting device 100, the position of the sliding member 120 can be fixed. When the object 10 is required to be lifted (for example, back to the highest position P1 shown in FIG. 1), the user can exert a force to pull up the sliding member 120. After the user stops exerting the force, the torque generated by the force exerted by the elastic member 130 may overcome the torque generated by the gravity of the object 10 and the sliding member 120 and generated by the net force of the friction forces between various components of the lifting device 100, and the sliding member 120 stays at any desired position.

In this way, the user can adjust a position of the object 10 and the sliding member 120 relative to the body 110, and the object 10 and the sliding member 120 can stay at any position on the sliding rail 112. Moreover, in FIG. 1 and FIG. 3, the object 10 is, for example, a display, but it can also be a working platform, etc.

In order to make it clear, the values of the aforementioned two situations are defined in the following chart and a deduction is described.

|  | Highest position P1 | Lowest position P2 |
|---|---|---|
| Force | F1 | F2 |
| Effective moment-arm of force | X1 | X2 |
| Torque generated by the force while taking a center of the adjusting member 140 as a fulcrum | $\tau 11$ | $\tau 21$ |
| Torque generated by gravity of the object 10 and the sliding member 120 while taking the first pivot 144 of the adjusting member 140 as a fulcrum | $\tau 12$ | $\tau 22$ |
| Torque generated by friction forces while taking the first pivot 144 of the adjusting member 140 as a fulcrum | $\tau 13$ | $\tau 23$ |

Obviously, $F1 \times X1 = \tau 11$, and $F2 \times X2 = \tau 21$. Moreover, $\tau 11 + \tau 12 + \tau 13 = 0$, and $\tau 21 + \tau 22 + \tau 23 = 0$. Since the elastic member 130 is minimally stretched at the highest position P1, and is maximally stretched at the lowest position P2, $F1 < F2$. And according to FIG. 5 and FIG. 6, it is obvious that $X1 > X2$. This way, a difference between $\tau 11$ and $\tau 21$ is not too large, and can even be zero.

Further, a minimum value of the force of the present embodiment is F1, and a maximum value thereof is F2, and correspondingly, X1 is the maximum value, and X2 is the minimum value, so that at any position between the highest position P1 and the lowest position P2, the torque generated by the force while taking the first pivot 144 of the adjusting member 140 as the fulcrum is ideally a fixed value.

However, in an actual application, the torque generated by the force while taking the first pivot 144 of the adjusting member 140 as the fulcrum is hard to be fixed, but to be slight higher or lower. At this time, other torques slightly changes to make a compensation. Since the torque generated by the gravity of the object 10 and the sliding member 120 while taking the first pivot 144 of the adjusting member 140 as the fulcrum is the same in both situations (i.e. $\tau 12 = \tau 22$), the total torques are maintained to zero according to variations of $\tau 13$ and $\tau 23$. For example, if $\tau 21$ is slightly increased compared to $\tau 11$, $\tau 23$ is slightly increased compared to $\tau 13$. On the other hand, it is familiar by those skilled in the art that the increase of $\tau 23$ depends on the variation and direction of the total friction forces. The details thereof are skipped.

Figure 7:
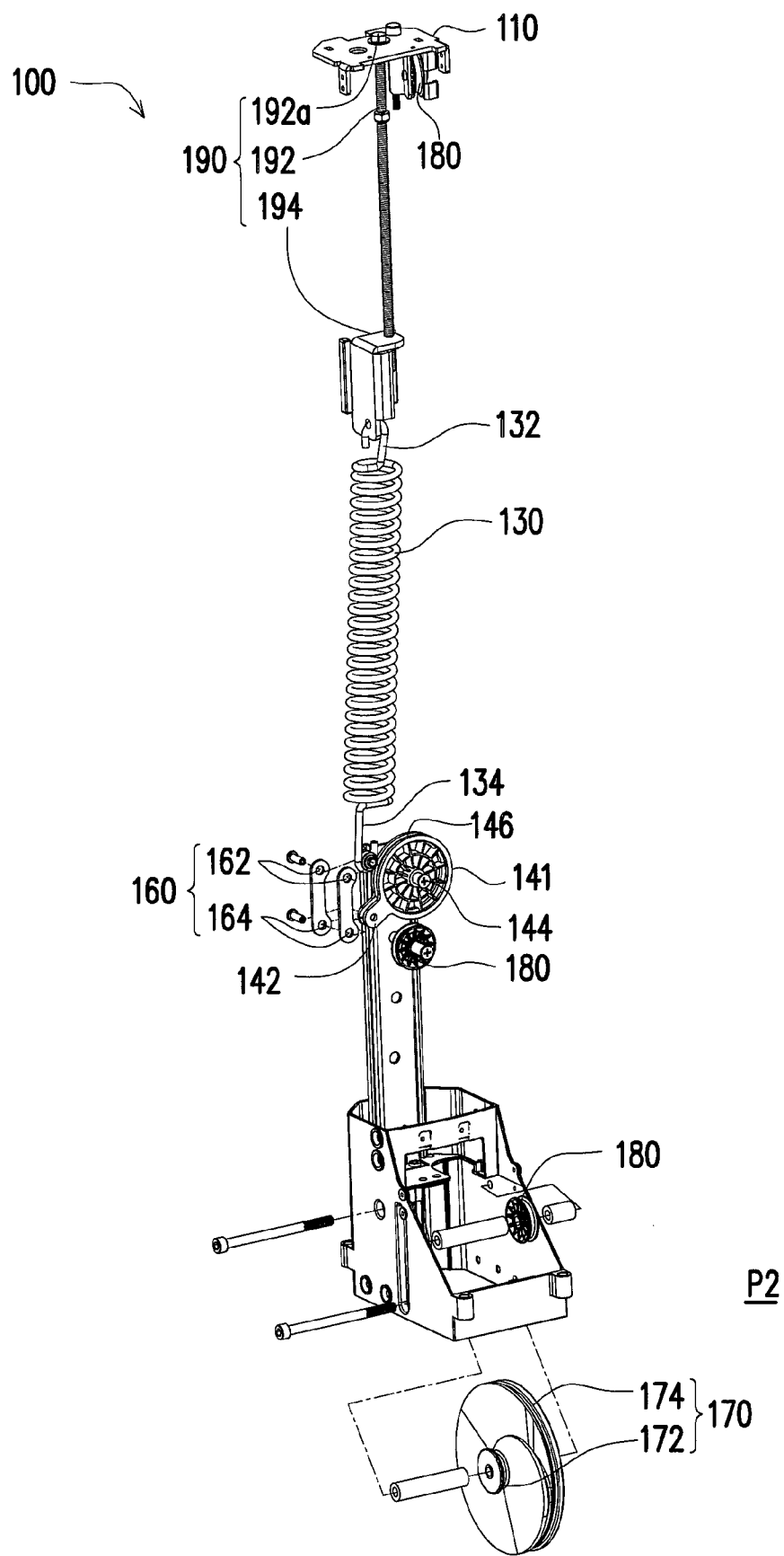
FIG. 7 is an internal exploded view of the lifting device of FIG. 1 at the lowest position.

FIG. 7 is an internal exploded view of the lifting device of FIG. 1 at the lowest position. Referring to FIG. 5 and FIG. 7, since the rotating portion 142 is linked up to the elastic member 130, when a deforming amount of the elastic member 130 changes, the rotating portion 142 correspondingly rotates. For example, in FIG. 6, the deforming amount of the elastic member 130 is increased compared to that in FIG. 5, so that a position of the rotating portion 142 of FIG. 6 is lower compared to a position of the rotating portion 142 of FIG. 5. If the second end 134 of the elastic member 130 is directly connected to the rotating portion 142, during a rotating process of the rotating portion 142, the friction force between the rotating portion 142 and the elastic member 130 is large, due to a relatively large rotating amplitude between the rotating portion 142 and the elastic member 130. In the present embodiment, the connection rod 160 is disposed between the elastic member 130 and the rotating portion 142, and based on a feature that the connection rod 160 is capable of rotating relative to the second end 134 of the elastic member 130 and the rotating portion 142, a rotating amplitude between the second end 134 of the elastic member 130 and the first end 162 of the connection rod 160 is thus smaller. It may effectively decrease the friction force between the elastic member 130 and the connection rod 160 during the rotation.

It should be noticed that as shown in FIG. 5 and FIG. 6, a connection line between the first end 132 and the second end 134 of the elastic member 130 is substantially parallel or overlapped to a connection line between the first end 162 and the second end 164 of the connection rod 160. In the present embodiment, the connection line between the first end 162 and the second end 164 of the connection rod 160 is orthogonal to the ground. In this way, the force exerted on the connection rod 160 by the elastic member 130 is still orthogonal to a direction of the moment-arm (a horizontal direction). It ensures that the effective force exerted by the elastic member 130 doesn't decay after transmitting through the connection rod 160.

Moreover, as shown in FIG. 7, the adjusting member 140 of the present embodiment has a groove 146 on a circumferential surface thereof for accommodating and fixing a part of the connecting member 150. The groove 146 is configured on a part of or the entire circumferential surface. In other embodiments, the circumferential surface of the adjusting member 140 can also be a smooth surface. One end of the connecting member 150 is fixed at a suitable position on the circumferential surface, and a part of the connecting member 150 close to such end winds around the groove 146, and the other part of the connecting member 150 stretches out away from the adjusting member 140. In the present embodiment, a position where the connecting member 150 is away from the adjusting member 140 is substantially fixed at about the seven o'clock position on the adjusting member 140 in FIG. 7, so that the effective moment-arm of the connecting member 150 can be maintained to a fixed value.

Figure 8:
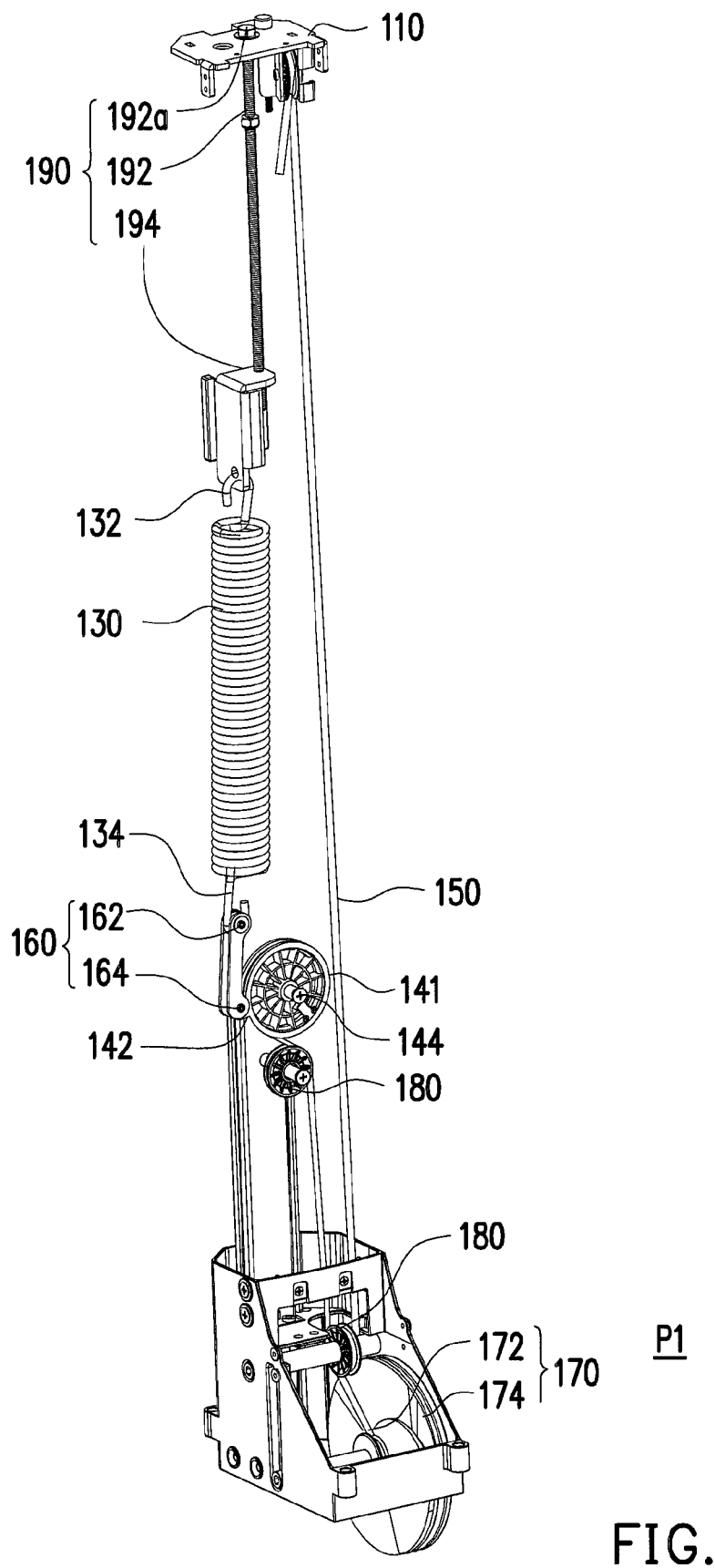
FIG. 8 is an internal three-dimensional view of the lifting device of FIG. 1 at the highest position.
Figure 9:
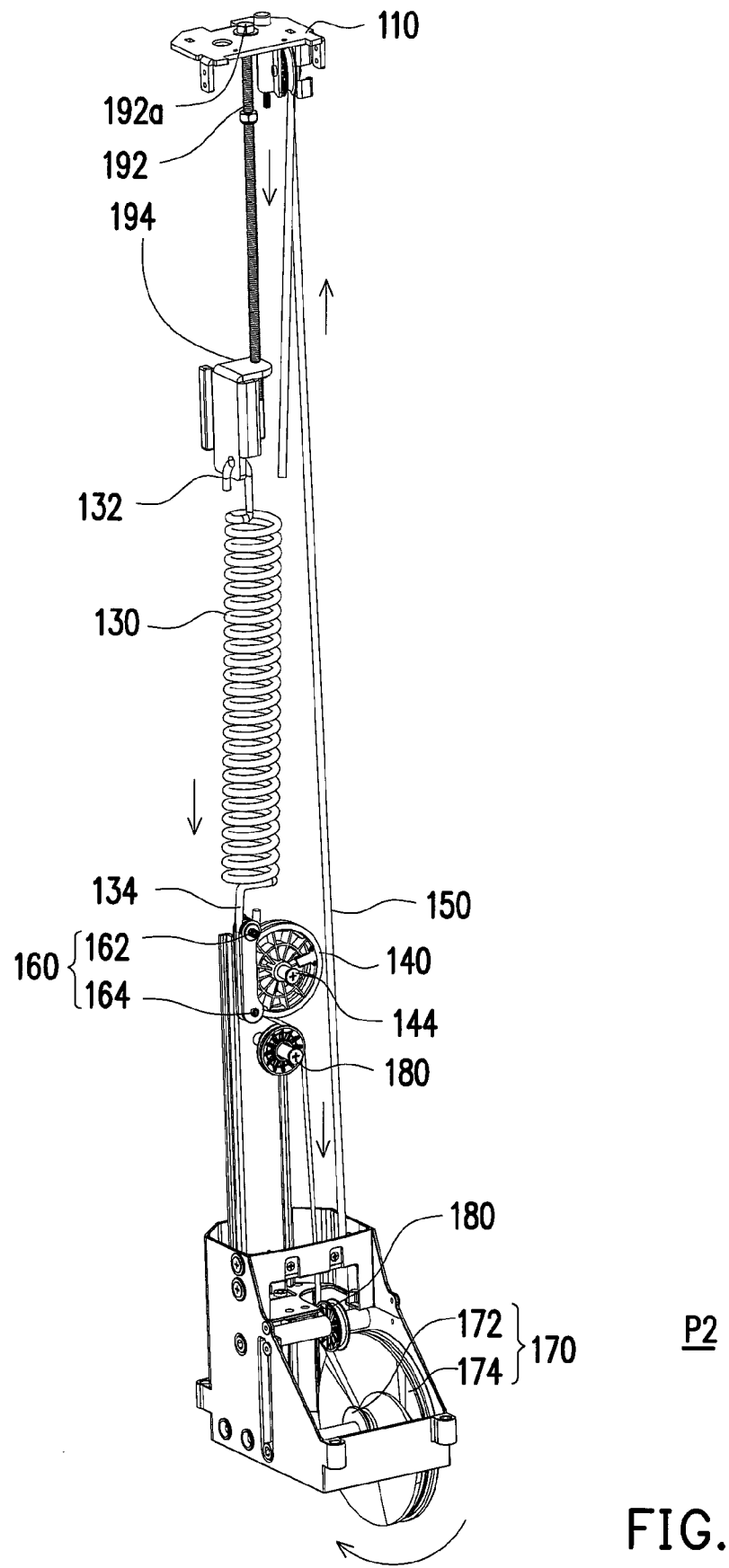
FIG. 9 is an internal three-dimensional view of the lifting device of FIG. 1 at the lowest position.

FIG. 8 is an internal three-dimensional view of the lifting device of FIG. 1 at the highest position. FIG. 9 is an internal three-dimensional view of the lifting device of FIG. 1 at the lowest position. Referring to FIG. 8 and FIG. 9, in the present embodiment, the lifting device 100 further includes a pulley block 170, which includes a first pulley 172 and a second pulley 174 coaxial to each other, where a diameter of the first pulley 172 is smaller than that of the second pulley 174. The connecting member 150 is, along the adjusting member 140, the first pulley 172 and the second pulley 174, connected to the sliding member 120.

In the present embodiment, when the sliding member 120 moves downwards, the connecting member 150 drives the pulley block 170 and the adjusting member 140 to rotate, thus making the rotating portion 142 rotate anticlockwise for increasing the deforming amount of the elastic member 130. As described above, no matter how the deforming amount of the elastic member 130 is increased, the torque generated by the force exerted by the elastic member 130 is balanced with a sum of the torque generated by the gravity of the object 10 and the sliding member 120 and the torque generated by the total friction forces (a sum of the friction forces between the body 110, the sliding member 120, the elastic member 130, the adjusting member 140 and the connecting member 150). And the object 10 and the sliding member 120 stay at any desired position.

During a rotating process of the pulley block 170, because the first pulley 172 and the second pulley 174 of the pulley block 170 are coaxial, and the diameter of the first pulley 172 is smaller than the diameter of the second pulley 174, when the first pulley 172 and the second pulley 174 are simultaneously rotated by an equal angle (a coaxial rotation), a length of the connecting member 150 rolled in the first pulley 172 is smaller than a length of the connecting member 150 released from the second pulley 174. Namely, a stretching amount of the elastic member 130 is smaller than a downward moving distance of the sliding member 120.

Vice versa, when the sliding member 120 moves upwards, a part of the connecting member 150 is withdrawn to the second pulley 174 of the pulley block 170, the connecting member 150 drives the pulley block 170 and the adjusting member 140 to rotate. When the first pulley 172 and the second pulley 174 are rotated by an equal angle, a length of the connecting member 150 released from the first pulley 172 is smaller than a length of the connecting member 150 rolled in the second pulley 174. Namely, a deforming amount of the elastic member 130 is smaller than an upward moving distance of the sliding member 120. During such process, the adjusting member 140 rotates clockwise, and the rotating portion 142 returns back to the horizontal position.

Therefore, in the lifting device 100 of the present embodiment, by using the first pulley 172 and the second pulley 174 that are coaxial with different diameters, the deforming amount of the elastic member 130 is much smaller than the moving amount of the sliding member 120. If the elastic member 130 and the sliding member 120 move by the same amount, the elastic member 130 stretched by the gravity of the object 10 has an excessive stroke length, under a long-term use, the elastic member 130 is liable to be disabled due to elastic fatigue, leading to a result that the whole lifting device cannot provide a normal function. Therefore, the lifting device 100 of the present embodiment can effectively prolong a service life of the elastic member 130.

Moreover, in the present embodiment, the first pulley 172 and the second pulley 174 are integrated, and the connecting member 150 is a rope, which is fixed to the sliding member 120 after winding the first pulley 172 and the second pulley 174 through the adjusting member 140. In other embodiments, the first pulley 172 and the second pulley 174 can be two separated pulleys, and the connecting member 150 may include two ropes, where one winds the adjusting member 140 and the first pulley 172, and the other winds the second pulley 174 and is connected to the sliding member 120. Through the coaxial rotation of the first pulley 172 and the second pulley 174, the rope winded to the second pulley 174 is significantly released and rolled in compared to the rope winded to the first pulley 172. Certainly, types of the first pulley 172 and the second pulley 174 are not limited by the invention.

Further, a ratio between a stretching amount of the elastic member 130 and a downward moving distance of the sliding member 120 is equivalent to a ratio between the diameters of the first pulley 172 and the second pulley 174. That is to say, the smaller the ratio between the deforming amount of the elastic member 130 and the moving amount of the sliding member 120 is, the greater a diameter difference between the first pulley 172 and the second pulley 174 is. However, a small ratio (or a small deforming amount of the elastic member 130) prolongs a service life of the elastic member 130, but makes the second pulley 174 occupy more space.

It should be noticed that since the object (for example, a television) is installed in the front of the lifting device, considering a gravity balance, a base of the lifting device is generally designed as a cuboid protruding forward. In collaboration with such design, in the present embodiment, the pulley block 170 is orthogonal to the fixed pulley 141 of the adjusting member 140, and an axis of the pulley block 170 is substantially orthogonal to an axis of the fixed pulley 141 of the adjusting member 140. Certainly, in other embodiments, the axis of the fixed pulley 141 of the adjusting member 140 and the axis of the pulley block 170 can also be configured in parallel, though the configuration method of the adjusting member 140 and the pulley block 170 is not limited thereto. However, if the diameter of the second pulley 174 is excessively large, a width of the body 110 cannot be reduced, and the base of the lifting device 100 is probably very large, which may cause inconvenience in package and delivery.

Since the adjusting member 140 and the pulley block 170 are not in a same plane, in order to smoothly wind the connecting member 150 and maintain a basic tension thereof to link up with the adjusting member 140 and the pulley block 170, the lifting device 100 further includes at least one turning pulley 180. In the present embodiment, the lifting device 100 includes two turning pulleys 180, which are respectively disposed between the adjusting member 140 and the pulley block 170 to change the configuration the connecting member 150 (causing two turning points). It ensures that the connecting member 150 keeps taut. Moreover, in the present embodiment, a turning pulley 180 is also configured on the body 180 and between the pulley block 170 and the sliding member 120, to change the configuration of the connecting member 150 between the pulley block 170 and the sliding member 120. By increasing or decreasing the number of the turning pulleys 180 and adjusting positions of the turning pulleys 180, the configuration of the connecting member 150 fits all situations.

Moreover, in the lifting device 100 of the embodiment, in order to stay the object 10 with different weights on the sliding rail 112 at any position and provide the same movable path for the objects 10 with different weights, the body 110 further includes a torque adjusting module 190. The first end 132 of the elastic member 130 is connected to the torque adjusting module 190. Further, the torque adjusting module 190 includes a screw 192 and an adjusting portion 194 screwed thereto. The screw 192 includes a nut 192a exposed and located outside of the body 110, and the first end 132 of the elastic member 130 is connected to the adjusting portion 194. By rotating the nut 192a exposed outside the body 110, the adjusting portion 194 screwedly moves along the screw 192, so as to adjust a relative position of the first end 132 of the elastic member 130 on the body 110.

For example, when the weight of the object 10 is larger than the primordial force supplied by the elastic member 130, the object 10 moves downwards. The elastic member 130 is extended until the torques are balanced as described above, and a balance position of the object 10 is under the highest position P1. Although the object 10 is capable of staying at a desired position under the balance position, the movable path of the object 10 with heavy weight is shortened. Under this situation, the nut 192a is rotated to cause a large deforming amount of the elastic member 130 in advance (i.e. provides a large pre-tension), such that a torque functioned on the rotating portion 142 by the elastic member 130 can be enough to resist a sum of the torque generated by the gravity of the object 10 and the sliding member 120 and the torque generated by the friction forced between the other components in the highest position P1, and the object 10 can stay at a desired position on the sliding rail 112.

Vice versa, when the weight of the object 10 is smaller than the primordial force supplied by the elastic member 130, the object 10 moves upwards until arriving a balance position which is above the highest position P1. The movable path of the object 10 with light weight would be lengthened, and the rotating portion 142 deviates from a horizontal position. When the object 10 is pulled down, the effective moment-arm is increased at first (before the rotating portion 142 is back to the horizontal position) and then decreased. In order to prevent the situation, the nut 192a is rotated to cause a small deforming amount of the elastic member 130 in advance (i.e. provides a small pre-tension), such that a sum of the torque generated by the gravity of the object 10 and the sliding member 120 and the torque generated by the friction forces between the other components is enough to resist the torque functioned on the rotating portion 142 by the elastic member 130 in the highest position P1, and the object 10 can stay at a desired position on the sliding rail 112.

It should be noticed that when the torque adjusting module 190 is adjusted, the object 10 is located at the highest position, with the rotating portion 142 keeping horizontal. Namely, the effective moment-arm is the maximum. In this way, when the object 10 is pulled down, the force exerted by the elastic member 130 is gradually increased, and the effective moment-arm is gradually decreased, and the torque generated by the force exerted by the elastic member 130 is substantially maintained consistent.

In the present embodiment, the first end 132 located on the top of the elastic member 130 is connected to the torque adjusting module 190, and the second end 134 located at the bottom is connected to the connection rod 160. However, in other embodiments, the objects connected to the first end 132 and the second end 134 of the elastic member 130 can also be reversed. That is to say, the torque adjusting module 190 can be disposed at the bottom, and the connection rod 160 can be disposed on the top. The second end 134 of the elastic member 130 can be fixed, and the elastic member 130 is stretched or compressed by the first end 132.

Figure 10:
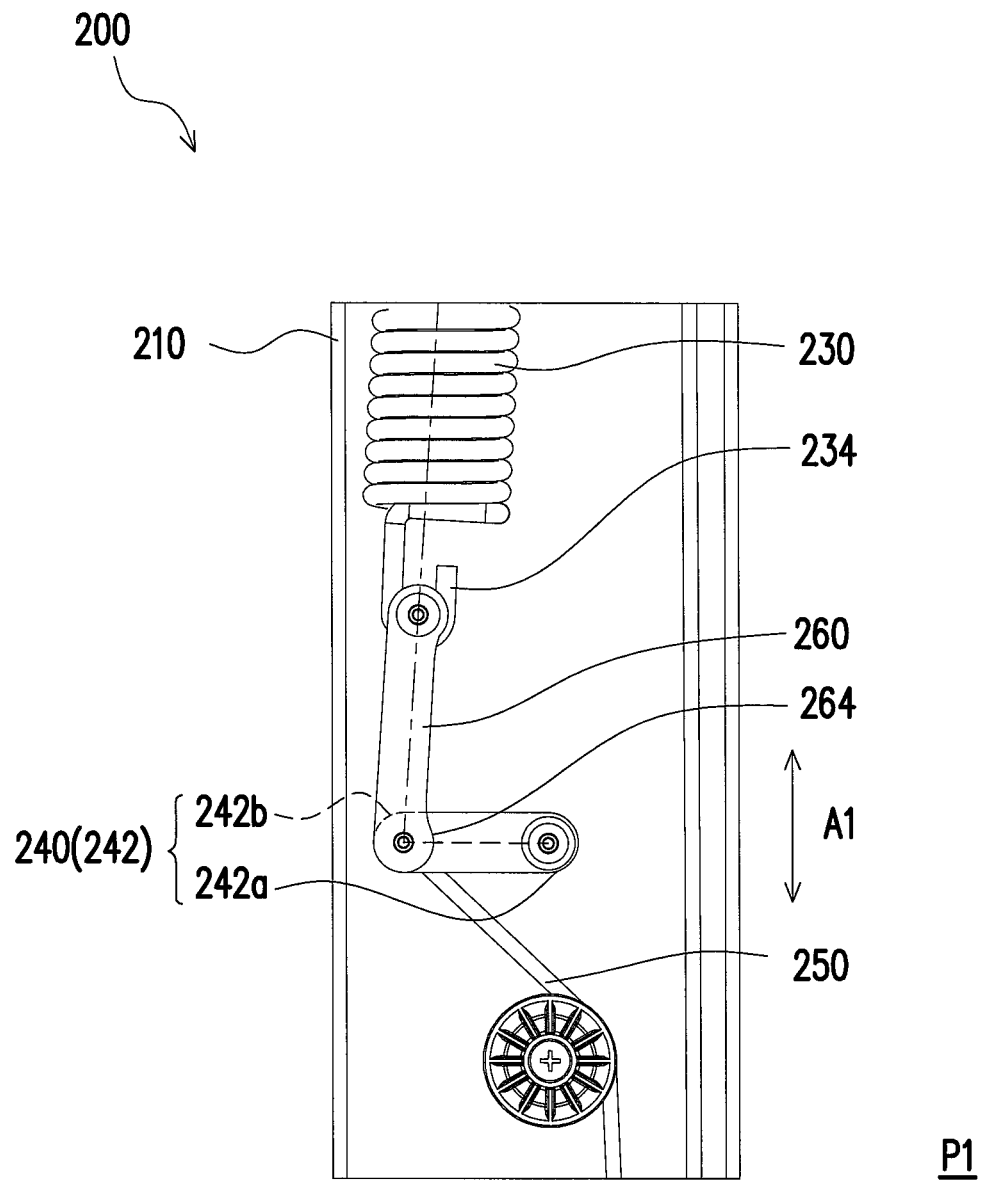
FIG. 10 is a partial internal front view of a lifting device with a sliding member located at a highest position according to another embodiment of the invention.

FIG. 10 is a partial internal front view of a lifting device with a sliding member located at a highest position according to another embodiment of the invention. Referring to FIG. 10, a adjusting member 240 includes a first pivot 242a pivotally connected to the body 210 and a rotating portion 242b capable of rotating relative to the first pivot 242a. A main difference between the lifting device 200 of FIG. 10 and the lifting device 100 of FIG. 1 is that the fixed pulley 141 of FIG. 1 is replaced by an arm lever 242 in FIG. 10, and the first pivot 242a and the rotating portion 242b are formed at two ends of the arm lever 242. The rotating portion 242b is pivotally connected to a second end 264 of a connection rod 260. A connecting member 250 is fixed on the arm lever 242.

When the sliding member (not shown) is at the highest position P1, a force exerted to the arm lever 242 by an elastic member 230 through the connection rod 260 is the minimum. Now, the arm lever 242 is perpendicular to the first axis A1, i.e. the arm lever 242 presents a horizontal state, and an effective moment arm functioned on the arm lever 242 by the elastic member 230 is the maximum.

Figure 11:
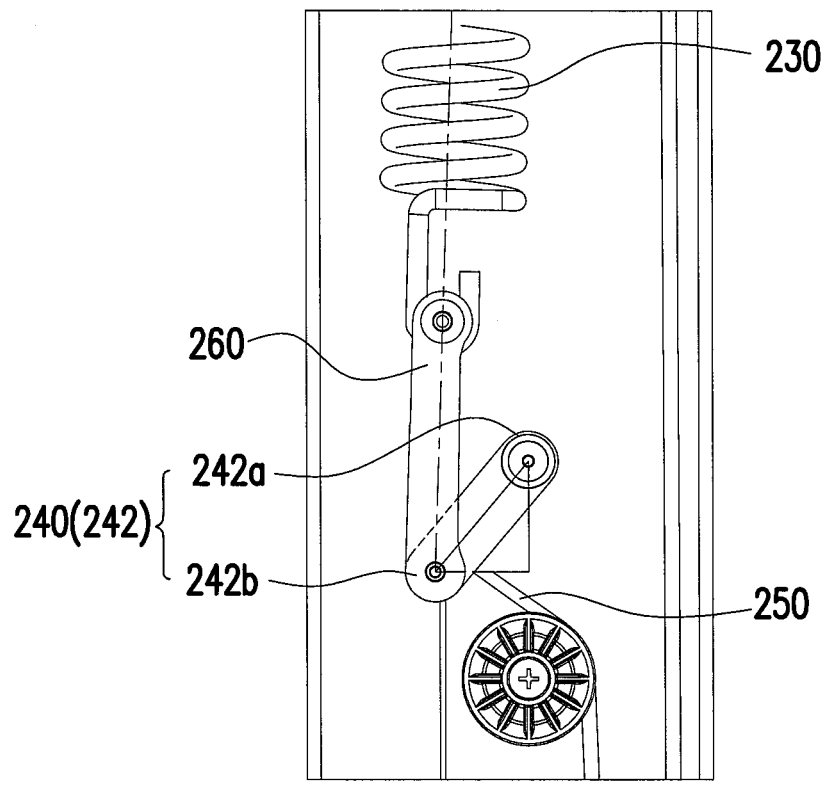
FIG. 11 is a partial internal front view of the lifting device of FIG. 10 with the sliding member located at the lowest position.

During a process that the sliding member (not shown in FIG. 10) moves downwards to the lowest position P2 along the first axis A1, a deforming amount of the elastic member 230 is gradually increased. FIG. 11 is a partial internal front view of the lifting device of FIG. 10 showing the sliding member located at the lowest position. Obviously, when the sliding member (not shown) is located at the lowest position P2, the deforming amount of the elastic member 230 is the maximum, and the arm lever 242 becomes synclinal through an anticlockwise rotation. Relatively, the force exerted to the arm lever 242 by the elastic member 230 is the maximum, and the effective moment-arm (a projecting amount perpendicular to the first axis A1) is the minimum.

Therefore, when the sliding member is at the highest position P1 and the lowest position P2, the torques functioned on the arm lever 242 by the elastic member 230 are substantially the same, and a sum of the above torque, the torque generated by the gravity of the object and the sliding member and the torque generated by friction forces between the other components are substantially zero, as described above.

In the present embodiment, the arm lever 242 is used to replace the fixed pulley 141 in FIG. 1, achieving the same effect, substantially. In other embodiments, the second end 234 of the elastic member 230 can be pivotally connected to the rotating portion 242b directly. Meanwhile, the type of the adjusting member 240, the configuration method between the adjusting member 240 and the elastic member 230 are not limited to those described above.

Figure 12:
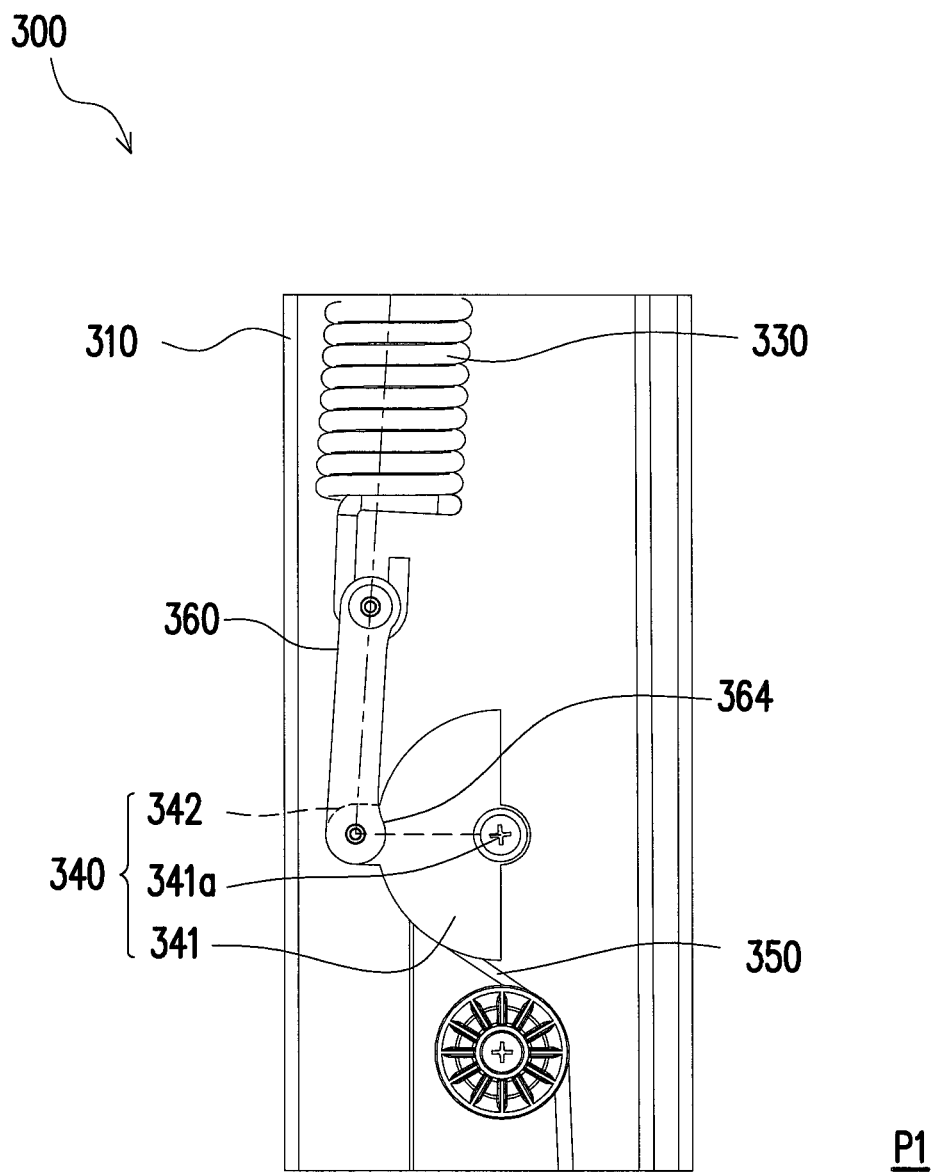
FIG. 12 is a partial internal front view of a lifting device with a sliding member located at a highest position according to still another embodiment of the invention.

Another type of the adjusting member is provided below for reference, and FIG. 12 is a partial internal front view of a lifting device with a sliding member located at a highest position of it. Referring to FIG. 12, a main difference between the lifting device 300 of FIG. 12 and the lifting device 100 of FIG. 1 is that the fixed pulley 141 with a round shape in FIG. 1 is replaced by a roller 341 with an incomplete round shape in FIG. 12 (the radian of the roller 341 in FIG. 12 is, for example, 180 degrees, though the invention is not limited thereto). The roller 341 is pivotally connected to a body 310 through a first pivot 341a. A rotating portion 342 protrudes out from a circumferential surface of the roller 341, and the rotating portion 342 is pivotally connected to a second end 364 of a connection rod 360. A connecting member 350 is fixed on the roller 341. Similarly, when the sliding member (not shown) is at the highest position P1, a force exerted to the rotating portion 342 by an elastic member 330 is the minimum. Now, the rotating portion 342 is perpendicular to the first axis A1, and the rotating portion 342 is horizontal, so the effective moment arm functioned on the rotating portion 342 by the elastic member 330 is the maximum in the situation.

Figure 13:
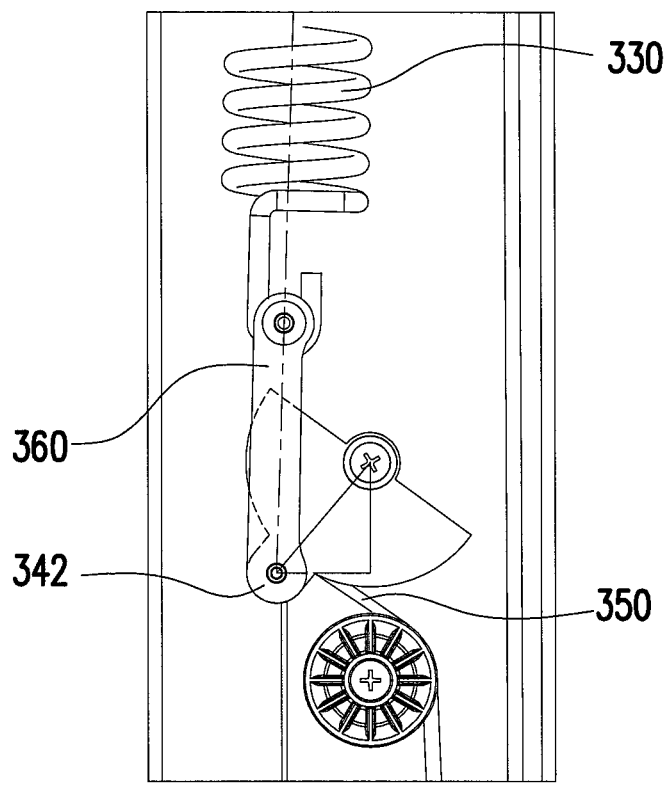
FIG. 13 is a partial internal front view of the lifting device of FIG. 12 with the sliding member located at the lowest position.

FIG. 13 is a partial internal front view of the lifting device of FIG. 12 with the sliding member located at the lowest position. Referring to FIG. 13, when the sliding member (not shown) is located at the lowest position P2, the deforming amount of the elastic member 330 is the maximum, and the effective moment-arm (a projecting amount perpendicular to the first axis A1) is the minimum. A sum of the torque functioned on the rotating portion 342 by the elastic member 330, the torque generated by the gravity of the object and the sliding member and the torque generated by friction forces between the other components are substantially zero, which achieves an effect that the object on the sliding member may stay at any position.

In summary, in the lifting device of the invention, the object disposed on the sliding member can be moved relative to the body. Moreover, since the adjusting member of the fixed pulley is linked up to the elastic member, when the elastic member deforms, the adjusting member rotates relative to the first pivot of the adjusting member, so that a moment-arm of a force exerted to the adjusting member by the elastic member changes along with a position of the adjusting member. When a deforming amount of the elastic member is small, a distance between the force endured by the adjusting member and the first pivot (i.e. the fulcrum) of the adjusting member is large. When the deforming amount of the elastic member is large, the distance between the force endured by the adjusting member and the first pivot of the adjusting member is small. Therefore, wherever the sliding member is at any position, taking the first pivot of the adjusting member as the fulcrum, a sum of a torque generated by the force endured by the adjusting member, a torque generated by gravity of the object and the sliding member, and a torque generated by friction forces between the body, the sliding member, the elastic member, the fixed pulley and the connecting member are substantially zero. Therefore, the object can stay at any position on the sliding rail, so as to achieve an effect of staying at any position. Moreover, in the lifting device of the invention, by winding the connecting member to the first pulley and the second pulley that are coaxial and have different diameters, the sliding member can be significantly moved through a smaller deforming amount of the elastic member, which effectively prolongs a service life of the elastic member, and is economic in fabrication and is convenient in post maintenance.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A lifting device, adapted to carry an object, the lifting device comprising:
   a body;
   a sliding member, slidably disposed at the body for carrying the object, and moving along a first axis and staying at any position between a highest position and a lowest position;
   an elastic member, comprising a first end disposed at the body and a second end;
   a adjusting member, linked up to the elastic member, and comprising a first pivot pivotally connected to the body and a rotating portion capable of rotating relative to the first pivot;
   a connecting member, having two ends respectively connecting the rotating portion of the adjusting member and the sliding member; and
   a connection rod, wherein the connection rod has a first end and a second end opposite to each other, the first end of the connection rod is connected to the second end of the elastic member, and the second end of the connection rod is connected to the adjusting member,
   wherein when the sliding member is located at the highest position relative to the body, the elastic member deforms to provide a first force to the adjusting member, taking the first pivot of the adjusting member as a fulcrum, a sum of a torque generated by the first force, a torque generated by gravity of the object and the sliding member, and a torque generated by friction forces between the body, the sliding member, the elastic member, a fixed pulley and the connecting member are substantially zero,
   when the sliding member is located at the lowest position relative to the body, the elastic member deforms to provide a second force to the adjusting member, taking the first pivot of the adjusting member as the fulcrum, a sum of a torque generated by the second force, a torque generated by gravity of the object and the sliding member, and a torque generated by friction forces between the body, the sliding member, the elastic member, the fixed pulley and the connecting member are substantially zero.

2. The lifting device as claimed in claim 1, wherein when the sliding member is located at the highest position relative to the body, a projection length of the adjusting member orthogonal to the first axis is the maximum, and when the sliding member moves to the lowest position relative to the body along the first axis, the projection length of the adjusting member orthogonal to the first axis gradually decreases.

3. The lifting device as claimed in claim 1, wherein when the sliding member is located at the highest position relative to the body, the first force is the minimum, and when the sliding member is located at the lowest position relative to the body, the second force is the maximum.

4. The lifting device as claimed in claim 1, wherein the adjusting member further comprises an arm lever pivotally connected to the first pivot, and the rotating portion is formed on the arm lever.

5. The lifting device as claimed in claim 1, wherein the adjusting member further comprises a fixed pulley sleeving the first pivot, and the rotating portion is formed on a circumferential surface of the fixed pulley.

6. The lifting device as claimed in claim 5, wherein the circumferential surface of the fixed pulley is a smooth surface, a part of the circumferential surface has a groove, or the entire circumferential surface has the groove.

7. The lifting device as claimed in claim 1, wherein a connection line between the first end and the second end of the elastic member is substantially parallel to a connection line between the first end and the second end of the connection rod.

8. The lifting device as claimed in claim 1, further comprising a pulley block having a first pulley and a second pulley coaxial to each other, wherein a diameter of the first pulley is smaller than a diameter of the second pulley, and the connecting member is, along the adjusting member, the first pulley and the second pulley, connected to the sliding member.

9. The lifting device as claimed in claim 8, wherein the first pulley and the second pulley are rotated equiangularly.

10. The lifting device as claimed in claim 8, wherein an axis of the pulley block is substantially orthogonal to the first pivot of the adjusting member.

11. The lifting device as claimed in claim 8, further comprising at least one turning pulley disposed between the adjusting member and the pulley block, or between the pulley block and the sliding member, to change the configuration of the connecting member.

12. The lifting device as claimed in claim 1, wherein the body comprises a torque adjusting module, and the first end of the elastic member is connected to the torque adjusting module.

13. The lifting device as claimed in claim 12, wherein the torque adjusting module has a screw and an adjusting portion screwed to the screw, the screw has a nut exposed and located outside of the body, the first end of the elastic member is connected to the adjusting portion, and the adjusting portion moves along the screw by rotating the nut, so as to adjust a relative position of the first end of the elastic member on the body.

14. The lifting device as claimed in claim 1, wherein the sliding member comprises a friction block contacting the body to provide a friction force.

15. The lifting device as claimed in claim 1, wherein effective moment-arms of the first force and the second force that take the first pivot of the adjusting member as a fulcrum are orthogonal to the first axis.

16. The lifting device as claimed in claim 1, wherein the connecting member is a rope or a plurality of ropes.

17. A lifting device, adapted to carry an object, the lifting device comprising:
   a body;
   a sliding member, slidably disposed at the body for carrying the object, and moving along a first axis and staying at any position between a highest position and a lowest position;
   an elastic member, comprising a first end disposed at the body and a second end;
   a adjusting member, linked up to the elastic member, and comprising a first pivot pivotally connected to the body and a rotating portion capable of rotating relative to the first pivot;
   a connecting member, having two ends respectively connecting the rotating portion of the adjusting member and the sliding member; and
   a pulley block having a first pulley and a second pulley coaxial to each other, wherein a diameter of the first pulley is smaller than a diameter of the second pulley, and the connecting member is, along the adjusting member, the first pulley and the second pulley, connected to the sliding member, wherein the first pulley and the second pulley are integrated so as to rotate equiangularly,
   wherein when the sliding member is located at the highest position relative to the body, the elastic member deforms to provide a first force to the adjusting member, taking the first pivot of the adjusting member as a fulcrum, a sum of a torque generated by the first force, a torque generated by gravity of the object and the sliding member, and a torque generated by friction forces between the body, the sliding member, the elastic member, a fixed pulley and the connecting member are substantially zero,
   when the sliding member is located at the lowest position relative to the body, the elastic member deforms to provide a second force to the adjusting member, taking the first pivot of the adjusting member as the fulcrum, a sum of a torque generated by the second force, a torque generated by gravity of the object and the sliding member, and a torque generated by friction forces between the body, the sliding member, the elastic member, the fixed pulley and the connecting member are substantially zero.

18. The lifting device as claimed in claim 17, wherein when the sliding member is located at the highest position relative to the body, a projection length of the adjusting member orthogonal to the first axis is the maximum, and when the sliding member moves to the lowest position relative to the body along the first axis, the projection length of the adjusting member orthogonal to the first axis gradually decreases.

19. A lifting device, adapted to carry an object, the lifting device comprising:
   a body;
   a sliding member, slidably disposed at the body for carrying the object, and moving along a first axis and staying at any position between a highest position and a lowest position;
   an elastic member, comprising a first end disposed at the body and a second end;
   a adjusting member, linked up to the elastic member, and comprising a first pivot pivotally connected to the body and a rotating portion capable of rotating relative to the first pivot;
   a connecting member, having two ends respectively connecting the rotating portion of the adjusting member and the sliding member; and
   a pulley block having a first pulley and a second pulley coaxial to each other, wherein a diameter of the first pulley is smaller than a diameter of the second pulley, and the connecting member is, along the adjusting member, the first pulley and the second pulley, connected to the sliding member, wherein an axis of the pulley block is substantially orthogonal to the first pivot of the adjusting member,
   wherein when the sliding member is located at the highest position relative to the body, the elastic member deforms to provide a first force to the adjusting member, taking the first pivot of the adjusting member as a fulcrum, a sum of a torque generated by the first force, a torque generated by gravity of the object and the sliding member, and a torque generated by friction forces between the body, the sliding member, the elastic member, a fixed pulley and the connecting member are substantially zero,
   when the sliding member is located at the lowest position relative to the body, the elastic member deforms to provide a second force to the adjusting member, taking the first pivot of the adjusting member as the fulcrum, a sum of a torque generated by the second force, a torque generated by gravity of the object and the sliding member, and a torque generated by friction forces between the body, the sliding member, the elastic member, the fixed pulley and the connecting member are substantially zero.

* * * * *